Aug. 5, 1958

L. P. EVANS 2,846,293

GRANULAR SOLIDS DISTRIBUTOR

Filed June 17, 1955

INVENTOR
*Louis P. Evans*
BY *Andrew L. Gaboriault*
ATTORNEY

# United States Patent Office 2,846,293
Patented Aug. 5, 1958

2,846,293

GRANULAR SOLIDS DISTRIBUTOR

Louis P. Evans, Woodbury, N. J., assignor to Socony Mobil Oil Company, a corporation of New York Application June 17, 1955, Serial No. 516,258

4 Claims. (Cl. 23—288)

This invention relates to the thermochemical conversion of hydrocarbon reactants in the presence of a moving bed of granular solids which may exhibit catalytic properties and which may supply or control the heat of reaction. More particularly, this invention relates to the maintenance of uniform temperature across a moving bed of granular contact material.

In the conversion of hydrocarbons as, for example, in the catalytic cracking of crudes to produce high yields in certain selected boiling ranges, it is known to supply heat to the endothermic reaction from the catalyst material. The catalyst or contact material becomes contaminated during the reaction and the contamination, being of a carbonaceous nature, is removed by burning. This reaction is strongly exothermic and the residual heat is retained in the regenerated contact material which is recycled back to the reactor to supply heat to the cracking operation. In equipment of the type in which this sort of conversion is carried out, the reactor is of much larger cross-section than the conduit used for recycling contact material to the reactor. This creates a problem of forming a uniform moving bed within the reactor as the contact material is supplied thereto.

In the past, catalyst has been fed to the type of the reactor through a series of vertical pipes on about 3 foot centers. The catalyst discharging from these pipes forms a series of conical piles which merge and form a moving bed of enlarged cross-section. As far as forming a bed is concerned and insuring that the various parts of the bed move at substantially the same flow rate, this arrangement is quite satisfactory. On the other hand, the piles which are formed present a series of surfaces through which the vaporized charge passes vertically. The contact material, however, flows laterally along the surface of these piles and is in contact with the cool vapor for an appreciable time. This effect is not present in the interior of the piles. The result of the uneven exposure of the contact material to the heat exchange effect of cool charge stock vapors is to create an uneven temperature gradient across the reactor. Bearing in mind that temperature and time of reaction are major factors in controlling a yield of a cracking operation, it can be seen that the effect of a temperature difference across the cross-section of the medium which supplies heat could cause the yield to be unsatisfactory in the desired boiling range of the end product.

In application Serial Number 338,774, filed February 25, 1953, now abandoned, which is owned in common herewith, there are disclosed several schemes for distributing the contact material across a larger area and introducing vapor phase charge stock therethrough with maintenance of a high degree of temperature uniformity across the moving bed. These designs are quite expensive to install, however, and, in some instances, difficult to maintain.

It is therefore an object of the present invention to overcome the foregoing difficulties and to provide a simple, economical but effective means for the distribution of contact material throughout a substantial area while maintaining a uniform temperature gradient across said area despite exposure of a portion of the contact material to media having a heat exchange effect thereon.

More specifically, it is an object of the present invention to equalize the temperature across a moving bed of contact material entering an endothermic reaction with a vapor phase hydrocarbon to be converted.

Other objects and advantages of this invention will be apparent from a consideration of the following detailed description of a preferred embodiment thereof in conjunction with the annexed drawings wherein.

Figure 2:
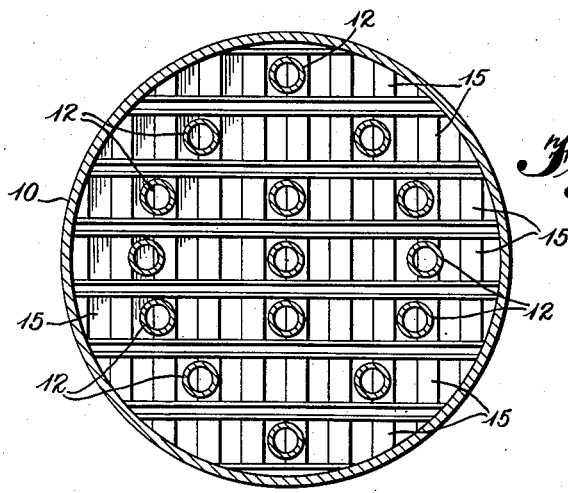
Figure 2 is a view in section taken along the line 2—2 of Figure 1, the contact material having been removed for convenience of illustration.

Referring now to the drawings in greater detail, the numeral 10 represents the shell of a reaction chamber of the type in which the catalytic cracking of hydrocarbons is effected by contacting the same with hot catalyst gravitating as a compact bed. Near the upper end of the shell 10 there is located a tube sheet 11 from which there depend a plurality of tubes 12 which carry the contact material from the plane of the tube sheet to a plane therebelow. In the side of the chamber 10 just below the tube sheet 11 there is a conduit 13 through which material to be cracked is introduced. The material introduced is in vapor phase and it passes under the tube sheet and moves downwardly as will be hereinafter more fully described. The contact material enters the chamber 10 from a conduit 14 which passes through the top of the chamber 10 and terminates above the tube sheet 11. The material spreads to assume a pile, the slope of which is the function of the angle of repose of the material. The material then flows out through the conduits 12 between the side walls of troughs 15 which are designed and constructed in accordance with the principles of the present invention. In the form of the invention shown there are seven troughs 15 disposed in parallel but spaced relationship chord-wise and diametrically across the reactor. These troughs are disposed directly below the outlet end of the conduits 12, the number of conduits serving each trough depending in large measure upon the length of the trough as can be easily seen from Figure 2. The chord-wise troughs near the outer wall of the reactor 10 are supplied by a single conduit 12. The center diametrical trough is supplied by three conduits 12 as are the two troughs next adjacent to it. The third trough out from the center on each side is fed by two pipes 12.

Figure 1:
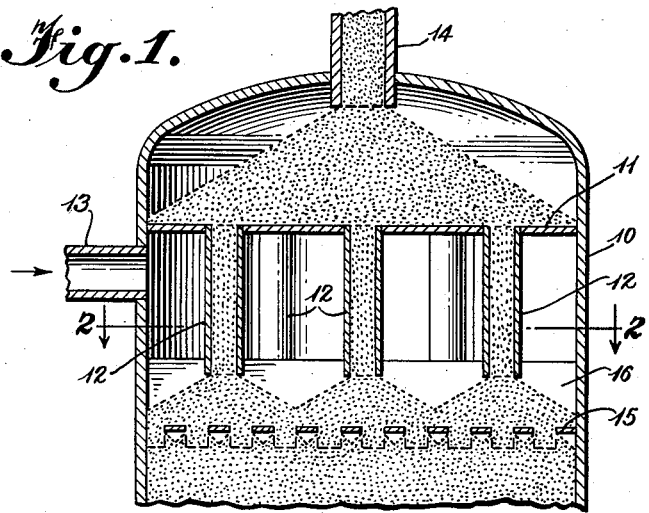
Figure 1 is a fragmentary view in vertical section of an upper portion of a reactor for the catalytic cracking of hydrocarbons showing the temperature controlling distributor plate of the present invention in operating position.
Figure 3:
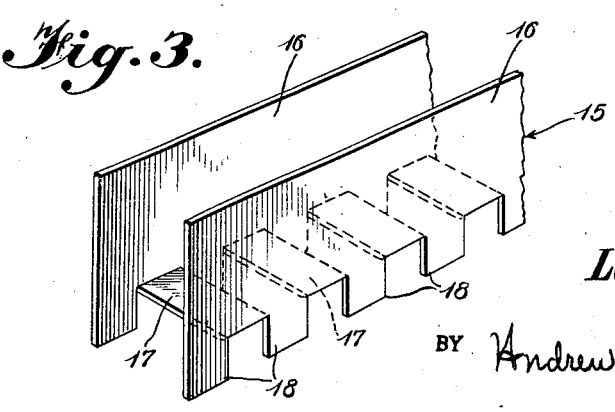
Figure 3 is a fragmentary perspective view of the heat controlling distributor of the present invention.

The construction of the troughs 15 can best be understood by reference to Figure 3 in which a part of one of them is shown. These troughs are made from a single piece of sheet metal by bending and cuttting. The result is a construction involving parallel side walls 16 having extending therebetween spaced apart plates 17 between which there is a space the end of which is baffled by depending portions 18 of the sheet. The troughs 15 are disposed in the reactor 10 with the uninterrupted edges of the sides 16 facing upwardly and extending above the lower ends of the conduits 12 as can be seen in Figure 1.

In view of the fact that the sides 16 define a trough which extends above the lower end of the conduits 12, the contact material flows directly into the troughs and does not flow into the space between adjacent troughs. On the other hand, the gaseous reactant entering the reactor 10 through the conduit 13 passes downwardly through the slots between adjacent troughs and then moves under the troughs through the catalyst free spaces which exist underneath the baffle plates 17. The contact material, of course, flows through spaces between the baffle plates and because of the close spacing of the baffle plates there is little tendency to the formation of piles and there is substantially uniform contacting of the contact material with the gas at the gas entry surface. This avoids the creation of areas of temperature differential which otherwise might exist.

In order that temperature differentials may be substantially minimized, each distributor trough 15 should be so constructed that the adjacent baffle plates 17 are less than 20 inches apart center to center, and preferably less than 10 inches and still more preferably less than 7 inches apart center to center. The phrase "center to center," as used herein, means the nearest distance between a line which extends horizontally along the longer axis of symmetry of one of baffle plates 17 between points equally distant from the end and side edges of the baffle plate and a similar line on the next adjacent baffle plate. This definition is further described and clarified by a drawing in U. S. patent application Serial Number 338,774, filed February 25, 1953, and the increased value of product which is obtained by minimization of temperature differentials is also illustrated in that application.

For similar reasons the distance between the sides of adjacent troughs should be less than 20 inches, preferably 10 inches and still more preferably 7 inches.

In order that vapors will be distributed uniformly across the upper surface of the reaction bed, the width of each of troughs 15 should not exceed 30 inches, preferably it should not be greater than 20 inches and still more preferably not greater than 15 inches.

The pipes 12 feeding troughs 15 should be spaced sufficiently close together to avoid segregation of contact material within the trough according to particle size. To achieve this these pipes should be spaced so that one of such pipes serves no more than 14 of slots 18, preferably no more than 10 and still more preferably no more than 4 of such slots.

While the illustrated form of the invention involves circular pipes for feeding to the troughs, it is to be understood that the uniform distribution of material to the troughs is an important factor to be considered so that the pipes could be elliptical, rectangular or of other cross-section, either throughout their lengths or at their ends so long as the distribution per unit area of troughs served remains substantially equal.

In describing the present invention the introduction of a vapor phase reactant into a gravitating bed of granular contact material has been used as an example, the utility of the temperature control being apparent in view of the endothermic nature of the reaction. It is to be recognized, however, that the apparatus of the present invention is economical to make and is an excellent distributor for moving bed granular material even where no temperature control problem is involved. It is specifically to be understood that the reactor shown in Figure 1 may be a part of a complete moving bed hydrocarbon conversion system of the type illustrated in Figure 2 of application Serial Number 338,774.

It is understood that it is intended to cover herein all the changes and modifications of the example of this invention, chosen herein for purposes of disclosure, which do not constitute departures from the spirit and scope of the invention.

What is claimed is:

1. Apparatus for contacting a moving bed of contact material with a vapor phase reactant that comprises a reactor, means to deliver a gravitating bed of contact material to said reactor at the top thereof, a tube sheet below the top of said reactor in the flow path of the contact material entering the reactor, a plurality of spaced parallel upright, upwardly extending troughs extending horizontally across said reactor below said tube sheet, said troughs being less than 30 inches in width and being spaced so that there is less than 20 inches between adjacent troughs, contact material distribution tubes extending from said tube sheet into said troughs, the bottoms of said troughs being defined by a plurality of plates extending between side walls in mutually spaced relation with apertures therebetween and there being sufficient of said tubes that there is at least one tube serving each 14 of said apertures, means to admit a vapor phase reactant into said reactor below said tube sheet and above said troughs and means to remove vapor from the lower section of said reactor below the bottom of said troughs, whereby vapor and contact material flow concurrently through the reactor.

2. Apparatus for contacting a moving bed of contact material with a vapor phase reactant that comprises a reactor, means to deliver a gravitating bed of contact material to said reactor at the top thereof, a tube sheet below the top of said reactor in the flow path of the contact material entering the reactor, a plurality of spaced parallel upright, upwardly extending troughs extending horizontally across said reactor below said tube sheet, said troughs being less than 30 inches in width and being spaced so that there is less than 20 inches between adjacent troughs, contact material distribution tubes extending from said tube sheet into said troughs, the bottoms of said troughs being defined by a plurality of plates extending between side walls in mutually spaced relation with apertures therebetween, said plates and apertures alternating and being of substantially the same shape and area as viewed in plan, the distance between adjacent plates being less than 20 inches center to center and there being sufficient of said tubes extending into each of said troughs that there is at least one tube for each 14 of said apertures, and means to admit a vapor phase reactant into said reactor below said tube sheet and above said troughs.

3. Apparatus for contacting a moving bed of granular contact material with a gaseous material, which comprises in combination: a reactor; a plurality of spaced, upright, upwardly extending troughs extending horizontally across the upper section of said reactor, said troughs being less than 30 inches in width and being spaced so that there is less than 20 inches between adjacent troughs and the bottoms of each of said troughs being defined by a plurality of plates in mutually spaced relation with apertures therebetween; contact material distribution tubes extending downwardly and terminating with lower ends within said troughs but above the bottoms thereof, there being sufficient of said tubes and said tubes being so spaced that there is at least one tube serving each 14 of said apertures; means for supplying contact material to the upper section of said tubes; means for removing contact material from the lower section of said reactor; means to admit gaseous material into the upper section of said reactor above said troughs and means to remove gaseous material from the lower section of said reactor at a level below the bottom of said troughs, whereby gaseous material and contact material flow concurrently through the reactor.

4. The apparatus of claim 3 further limited to said plates forming the bottom and each of said troughs being spaced so that there is a center to center distance less than 20 inches between adjacent plates.

References Cited in the file of this patent

UNITED STATES PATENTS

| 2,389,493 | Evans | Nov. 20, 1945 |
| 2,418,672 | Sinclair et al. | Apr. 8, 1947 |
| 2,770,583 | Haddad | Nov. 13, 1956 |